April 7, 1970         A. S. WATSON         3,505,638
DIRECTION FINDING APPARATUS
Filed March 26, 1968         3 Sheets-Sheet 1
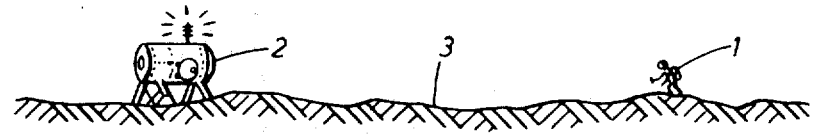
FIG.1
FIG.2

April 7, 1970          A. S. WATSON          3,505,638
DIRECTION FINDING APPARATUS
Filed March 26, 1968          3 Sheets-Sheet 2

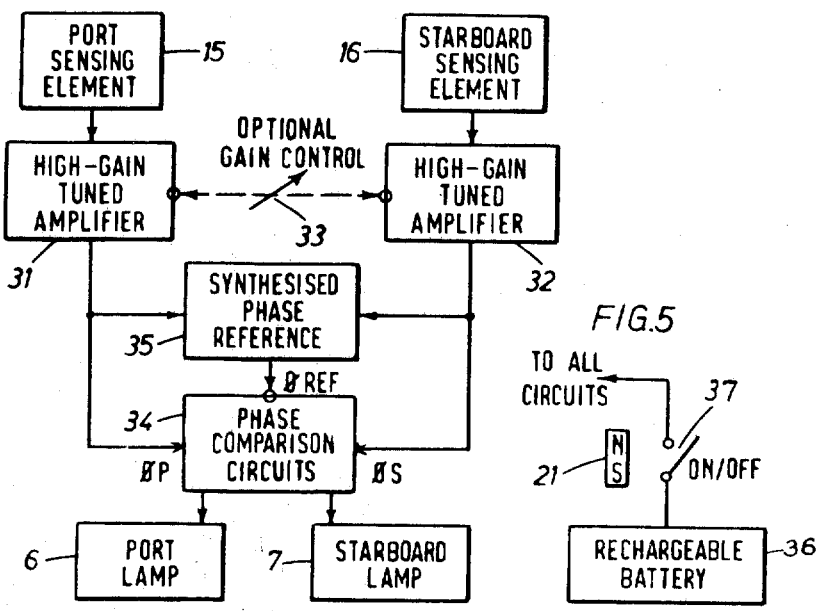
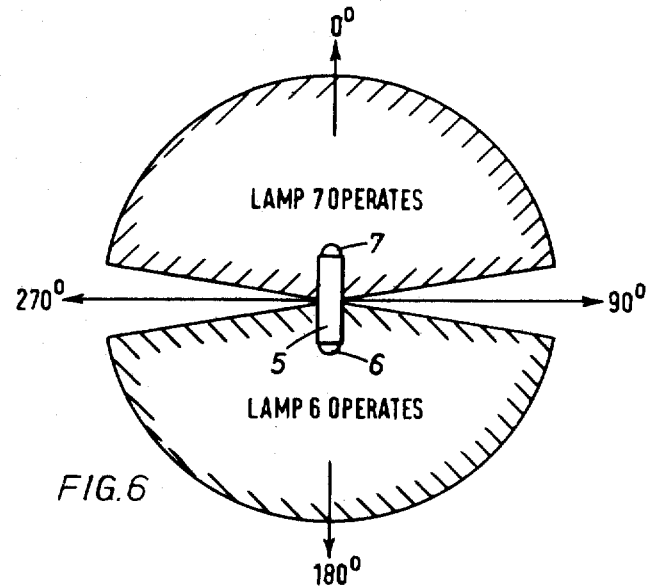
FIG.6

┌─────────────────────────────────────────────┐
United States Patent Office                 │
│                                 3,505,638   │
│                         Patented Apr. 7, 1970│
└─────────────────────────────────────────────┘

3,505,638
DIRECTION FINDING APPARATUS
Alexander Smith Watson, Dartmouth, Nova Scotia, Canada, assignor to E. M. I. Cossor Electronics Limited, Dartmouth, Nova Scotia, Canada, a company of Canada
Filed Mar. 26, 1968, Ser. No. 716,038
Claims priority, application Great Britain, Mar. 28, 1967, 14,012/67
Int. Cl. G01s 3/46
U.S. Cl. 340—6                              1 Claim

ABSTRACT OF THE DISCLOSURE

There is provided a portable direction finding receiver responsive to acoustical pulses of oscillation including two acoustical transducers in spaced relationship mounted on a connecting member, two lamps each associated with a respective transducer, and a sensing circuit for causing one or other lamp to light up depending on which transducer first senses a transmitted pulse to provide an indication of the direction of the pulse source.

---

This invention relates to direction finding receivers and especially though not exclusively to portable acoustic direction finding receivers for use under water.

There are many circumstances in which persons working in conditions of poor visibility or in locations void of clear landmarks may become disorientated and lose their sense of direction. This is particularly the case where their destination is an objective other than the point of departure.

One example of a situation of this kind concerns divers, both free-swimming and tethered, who often get disorientated under water due to bad visibility. In the case of divers starting from the surface, a return to base has generally been possible by the use of a lifeline, or by releasing bubbles whose position was reported back from observers on the surface or by the diver returning to the surface himself. However, in underwater laboratories known as sea-labs, surfacing is out of the question due to pressure-saturation, and lifelines are also inconvenient and may be unusable for near floor work. Under such conditions a diver requires means for orientating himself both with regard to his objective and with regard to his point of departure.

Various proposals have been made hitherto to assist a diver to navigate underwater, such as the use of self contained sonar sets or transponding equipment which are, in general, complex, inconvenient to operate and bulky due to the large directional arrays frequently required.

It is an object of the present invention to provide improved direction finding apparatus which offers significant advantages in one or more of the following factors: circuit simplicity, absence of bulky transducing equipment and unambiguous display facilities.

According to the present invention there is provided a portable direction finding receiver responsive to acoustical pulses of oscillation including two acoustical transducers in spaced relationship mounted on a connecting member, two lamps each associated with a respective transducer, and a sensing circuit for causing one or other lamp selectively to light up depending on which transducer first senses a transmitted pulse to provide an indication of the direction of the pulse source.

Figure 3:
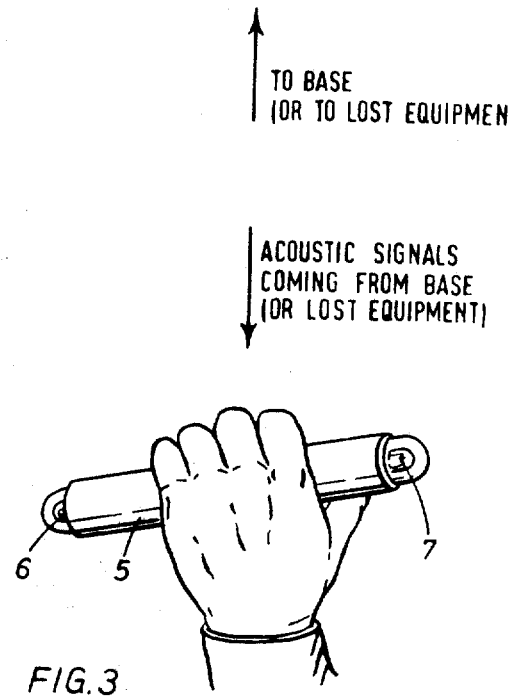
Figure 4:
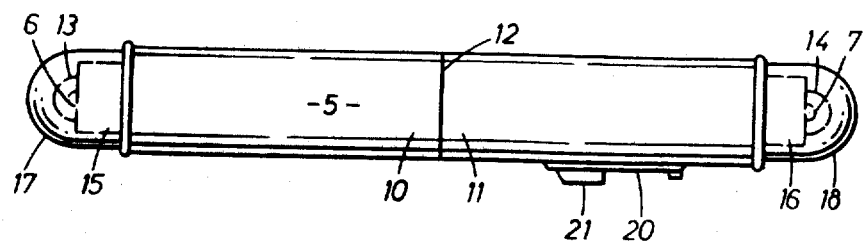

In order that the present invention may be clearly understood and readily carried into effect an embodiment of the same will now be described by way of example and with reference to the drawings of which:

FIGURE 1 illustrates one environment in which the invention may usefully be employed,
FIGURE 2 illustrates a further use of the invention,
FIGURE 3 is a detail illustrating the operation of a receiver in accordance with an example of the invention,
FIGURE 4 is a view of a receiver in accordance with an example of the invention taken from above,
FIGURE 5 is an electrical block diagram of a receiver in accordance with an example of the invention, and
FIGURE 6 is a diagram showing the operational performance of the receiver as a source direction is rotated about the centre of the receiver.

In one example the present invention provides an improved form of personal portable underwater acoustic receiver for use by divers in situations wherein the desired objective, whether it be the point of departure or the location of an object being sought, can be fitted with a transmitting acoustic beacon, pulsing once every few seconds at a suitable frequency which can be within or above the audible range.

The personal homing receiver constructed in accordance with this example, the invention employs a mode of detection which employs a form of time or phase comparison between signals received by two spaced transducers. This allows improvements to be made in the directional accuracy, miniaturisation and operating convenience of the equipment over prior proposals. The receiver would be employed in the types of situation illustrated in FIGURES 1 and 2. FIGURE 1 shows the case where a diver 1 is seeking to return to his base 2 shown as a sea-lab structure on the ocean floor 3. FIGURE 2 illustrates the use of the receiver to assist a diver 1 in locating lost equipment 4 equipped with an acoustic beacon.

The receiver unit, 5, constructed in accordance with this example of the invention, is shown in use in FIGURE 3. It is cylindrical in form and is provided with lights 6, 7, one at each end. The receiver provides a flashing light signal to indicate to the diver the direction of his objective. The manner of operation of the receiver is that when the receiver is held in the hand and turned in various directions, the light 7 at the end nearest to the transmitting source would flash on for each transmitted pulse as shown in FIGURE 3. When the receiver is turned slightly the other way to that shown in FIGURE 3, so that the other end is nearer to the source, the light 6 at the other end would flash. In this way, by turning the receiver alternately one way and then the other, the diver is enabled to walk or swim in a direct line towards his objective.

Thus, it will be appreciated that by using this receiver a diver can home in rapidly to any object or equipment, providing that it is equipped with an acoustic beacon, and lost mines, torpedoes, buoys, transponders or other equipment may be rapidly recovered and brought back to base using this type of receiver.

The external view of one form of receiver 5, constructed in accordance with this example of the invention, is shown from above in FIGURE 4. A cylindrical casing 10, 11 is made in two halves which are joined together in a demountable manner and the joint sealed by a watertight seal 12.

At each end of the receiver is located a lamp 6, 7, each covered by a clear epoxy resin dome 13, 14, and a short substantially aperiodic ceramic transducer element 15, 16, covered by a protective wire cage 17, 18. A switch 20 is provided in the form of a sliding member 21 biased by a spring into the off position. In order to avoid pressure seal problems, the sliding member 21 incorporates a permanent magnet which co-operates with a magnetically closed switch situated within the casing.

A block diagram of the receiver is shown in FIGURE 5 to which reference will now be made. The receiver 5 will be assumed to be held so that the transducers 15 and 16 are situated respectively to the port and starboard of the hand of the diver. The outputs of the ceramic transducers 15 and 16 are fed to respective high gain tuned amplifiers 31 and 32. A gain control 33 may be provided, if desired, to enable the gains of the amplifiers 31 and 32 to be varied. The outputs of the amplifiers 31 and 32 are fed to the inputs of respective phase comparison circuits shown by the block 34 in which the phase of the respective port or starboard element signal is compared with a reference phase which is synthesised by adding together the two amplifier outputs in the synthesiser 35 to give a wave whose phase lies intermediate between the phases of the port and starboard signals. Thus by applying this synthesised reference to the port and starboard phase comparison circuits 34, the relative phase advance or retard of the respective signals may be converted into a voltage of corresponding positive or negative polarity. The polarity of this voltage is employed selectively to trigger the respective port or starboard indicator lamp 6, 7 causing it to light in response to a phase advance of the signal from the corresponding sensing element 15, 16. The magnet 21 in the slide of the switch 20, closes the contacts 37 of the switch allowing power from a battery source 36, which may be of a rechargeable type, to energize the equipment.

The receiver may be made compact and small in size. In the example shown in FIGURE 3, the overall length is approximately seven inches and the diameter about one inch. The receiver may normally be kept in a hip-sheath or knee pocket or other suitable place in the driver's apparel, in a switched off condition, until a need to home on a beacon develops. The receiver is then taken out, switched on, and held in one hand so that the longitudinal axis lies in a horizonal plane. Assuming that acoustic beacon pulses are arriving from the port side, the lamp 6 will flash on for each pulse and the diver will turn the receiver until the lamp 6 ceases to flash. By continuing to turn the receiver until lamp 7 starts to flash and then oscillating the receiver between the positions at which lamp 6 and lamp 7 start flashing, the diver can estimate the direction of the beacon to lie along the direction at right angles to the receiver half way between the two positions, and in the direction towards which either end of the receiver must be turned in order to cause the lamp at that end to light. The diver therefore obtains from the receiver an unambiguous indication of the direction in which he has to swim to reach his objective. Normally the diver would be looking for a beacon attached to an object on the sea bed, but the receiver may be equally well employed in a similar way to home in the vertical direction if required by rotating the longitudinal axis about the centre point in a vertical plane.

The directional response of the receiver in the plane in which it is rotated is illustrated in FIGURE 6, in which the angular indications represent the bearing of an acoustical source with reference to the axis of the receiver in the direction of the indicator lamp 7.

The receiver can be readily manufactured for use on any preselected frequency within a range of, say, 3 kHz. and 30 kHz. which is the probable range of propagation frequencies that will be employed in such a detection system.

The transducers employed are substantially aperiodic and the beacon frequency is filtered electrically in the tuned amplifiers 31 and 32. As a consequence of this, it is a relatively simple and convenient matter to adjust the receiver to alternative working frequencies. In use, when a predetermined number of different destination beacons are in use, the small size and light weight of the receiver is such that the diver may carry two or more receivers preadjusted to different beacon frequencies and employ them selectively as required, say to locate an object and then to return to base.

What I claim is:
1. A portable direction finding receiver responsive to acoustical pulses of oscillation, comprising
 (a) a small rod like member which can be clasped in one hand and of such a length as to project from both sides of the hand,
 (b) two acoustical transducers in spaced relationship mounted in the vicinity of a respective end of said member,
 (c) two lamps in spaced relationship mounted in the vicinity of a respective end of said member,
 (d) a sensing circuit for causing one or other lamp to light up depending on which transducer first senses a transmitted pulse to provide an indication of the direction of the pulse source,
 (e) said member being in the form of a waterproof container housing said sensing circuit and a power supply.

References Cited

UNITED STATES PATENTS

| | | | |
|---|---|---|---|
| 2,166,991 | 7/1939 | Guanella | 340—6 X |
| 2,535,255 | 12/1950 | Barnes et al. | 340—16 |
| 2,560,265 | 7/1951 | Adler | 343—122 X |
| 2,951,248 | 8/1960 | Goodell | 343—113 |
| 3,005,183 | 10/1961 | Mayes | 340—6 |
| 3,181,111 | 4/1965 | Gordon | 340—6 X |
| 3,222,634 | 12/1965 | Foster | 340—6 X |
| 3,286,224 | 11/1966 | Zefting | 340—6 |

RICHARD A. FARLEY, Primary Examiner

U.S. Cl. X.R.

340—16